United States Patent
Gassoway

(10) Patent No.: US 7,757,287 B2
(45) Date of Patent: Jul. 13, 2010

(54) SYSTEMS AND METHODS FOR COMPUTER SECURITY

(75) Inventor: Paul A. Gassoway, Norwood, MA (US)

(73) Assignee: Computer Associates Think, Inc., Islandia, NY (US)

( * ) Notice: Subject to any disclaimer, the term of this patent is extended or adjusted under 35 U.S.C. 154(b) by 818 days.

(21) Appl. No.: 10/826,987

(22) Filed: Apr. 19, 2004

(65) Prior Publication Data
US 2005/0235164 A1    Oct. 20, 2005

(51) Int. Cl.
*G06F 12/14* (2006.01)

(52) U.S. Cl. .............................. 726/24; 726/23; 713/188

(58) Field of Classification Search ............. 726/22–25, 726/4; 713/188
See application file for complete search history.

(56) References Cited

U.S. PATENT DOCUMENTS

| 5,623,600 | A | | 4/1997 | Ji et al. | |
|---|---|---|---|---|---|
| 5,842,002 | A | * | 11/1998 | Schnurer et al. | 703/21 |
| 5,948,104 | A | * | 9/1999 | Gluck et al. | 726/24 |
| 6,577,920 | B1 | * | 6/2003 | Hypponen et al. | 700/200 |
| 6,968,394 | B1 | * | 11/2005 | El-Rafie | 709/245 |
| 7,080,000 | B1 | * | 7/2006 | Cambridge | 703/21 |
| 7,231,666 | B2 | * | 6/2007 | Haugh | 726/22 |
| 2003/0061515 | A1 | * | 3/2003 | Kindberg et al. | 713/201 |
| 2003/0145094 | A1 | * | 7/2003 | Staamann et al. | 709/229 |
| 2005/0050353 | A1 | * | 3/2005 | Thiele et al. | 713/201 |

OTHER PUBLICATIONS

"Trend Micro InterScan Web Security Suite Getting Started Guide" Sep. 2003, Trend Micro Incorporated, Cupertino, CA 95014, USA.
"Trend Micro Competitive Web Security: Performance Testing" VERITEST, 'Online!' Aug. 2003.

* cited by examiner

*Primary Examiner*—Kimyen Vu
*Assistant Examiner*—Edward Zee
(74) *Attorney, Agent, or Firm*—Baker Botts L.L.P.

(57) ABSTRACT

A method and system for maintaining computer security including providing a signature file; receiving an incoming message from at least one client computer; comparing the received incoming message with the signature file to determine whether the incoming message is malicious; and blocking the incoming messages determined to be malicious from reaching a web server.

32 Claims, 7 Drawing Sheets

SYSTEMS AND METHODS FOR COMPUTER SECURITY

BACKGROUND

1. Technical Field

The present disclosure relates to security and, more particularly, to a method and system for computer security.

2. Description of the Related Art

With the growth of the Internet, the increased use of computer systems and the exchange of information between individual users pose a threat to the security of computers, including, to web servers. Computer security attempts to ensure the reliable operation of networking and computing resources and attempts to protect information on the computer or network from unauthorized access or disclosure. Computer system(s) as referred to herein may include(s) individual computers, servers, computing resources, networks, etc. Among the various security threats that present increasingly difficult challenges to the secure operation of computer systems are hypertext transfer protocol (HTTP) attacks, computer viruses, worms, Trojan horses, etc. HTTP attacks are often targeted at exploiting known web site vulnerabilities by manipulating application behavior for malicious purposes. Computer viruses are programs that can infect other programs by modifying them in such a way as to include a copy of themselves. Unlike computer viruses, worms do not need to infect other programs. Worms are independent programs that are capable of reproducing themselves; spreading from machine to machine across network connections, often via email. These threats prey on system vulnerabilities and have proven themselves to be extremely destructive, often times altering databases, destroying electronic files, and even disabling the computer network itself.

HTTP is a client/server request/response type protocol used by the web. HTTP specifies that a client open a connection to a server and send a request using a specified format. The server may then respond and then close the connection.

Using HTTP, hackers can very easily attack a web site with nothing more than a web browser and basic knowledge of a scripting language (e.g., SQL). HTTP attacks can be devastating because they may allow hackers to obtain customer information, steal company assets, and falsify information; effectively destroying a web site. Examples of HTTP attacks include: cookie positioning (allows for encrypted customer data to be altered), parameter modification (allows hackers to gain access to confidential data by modifying the parameters in the uniform resource locator (URL)), cross site scripting (allows hackers to re-direct customers to another web site), etc.

System administrators responsible for the efficient operation of computer networks may use many different techniques to protect the system from such attacks. Those techniques may include installing firewalls, utilizing virus checking software to detect viruses, and employing patching software to counteract contracted viruses. A firewall is basically a separate computer system and/or software system composed of a set of related programs that is placed between a private computer system and a public network (i.e., Internet). A firewall provides security protection to the system by screening incoming requests and preventing unauthorized access. Firewalls operate by working with router programs to determine the next destination to send information packets, ultimately deciding whether or not to forward the packets to that location. Firewalls can also impose internal security measures on users in the system by preventing them from accessing certain materials, such as websites on the World Wide Web, that may have unknown and potentially dangerous security consequences. Proxy servers, often associated with firewalls, are programs that act as intermediaries between web servers and web browsers. More specifically, proxy servers forward requests from users in the private network through the firewalls to Internet services, retrieve the requested information, and return it to the web server. Reverse proxy servers work like normal proxies; however, they operate in the reverse. That is, they forward requests from the Internet through the firewall to the private network's web server, retrieve the requested information, and return it to the Internet user. However, currently available proxies may not successfully block out all attacks on the private network's web server. Reverse proxy servers address non-HTTP attacks, attacks on other services running on the network, leaving the network's web server vulnerable to HTTP attacks. For example, a security plan for a web site may include a firewall between the public network (Internet) and the web server that locks down unused Internet ports. A problem with such an arrangement is that Port 80, the port that is used for web traffic (HTTP traffic) cannot be blocked because doing so would shut down all web traffic to the site. Therefore, hackers effectively have a carte blanche to launch their HTTP attacks through Port 80.

Virus checking software operates to protect the network from the spread of viruses by detecting the virus and isolating or removing the viral code. Virus checking software may be employed in each computer connected to the network (through the desktop) and/or at the server level (through the firewall). Virus checking software may contain a list of previously defined virus signatures, containing the binary patterns of a virus, each associated with a virus and scan the various files of the system looking for a match to a particular virus signature. If a virus is detected, the user is notified and further steps may be taken to rid the system of the malicious code. The problem with anti-virus programs is that they should be continuously updated to be able to detect new and modified viruses. This not only proves to be a very tedious and time consuming task for very large networks that have hundreds of users, but also may not happen often enough to provide adequate safeguards against foreign intrusions. Furthermore, although the anti-virus software may detect viruses present in the system, it does nothing to prevent them from infiltrating the system in the first place.

Patching is the process by which security holes and system vulnerabilities are closed through the application of a "patch", updated software code that is used to address bugs. However, in large companies, to ensure that the application of a patch will be feasible, system administrators are forced to comply with specific procedures before applying patches, for example, to ensure that the patch will do no further damage to the system. These procedures often take time and increase the chances that an exploit will be able to compromise the organization's web servers before the patch is even applied. In addition, a more prevalent problem with patches is that system administrators of large and small companies alike, need to continuously monitor appropriate information sources to be aware of new patches. Thus, administrators are burdened with continuously keeping up to date to minimize the chance of security breaches.

Accordingly, it would be beneficial to provide a method and system for preventing security breaches altogether and ensuring that exploitation of system vulnerabilities will not come to light.

SUMMARY

A method for maintaining computer security according to an embodiment of the present disclosure includes providing a signature file, receiving an incoming message from at least one client computer, comparing the received incoming message with the signature file to determine whether the incoming message is malicious and blocking the incoming messages determined to be malicious from reaching a web server.

A system for maintaining computer security according to an embodiment of the present disclosure includes a signature file, a web server, and a proxy machine receiving an incoming message from at least one client computer, comparing the received incoming message with the signature file to determine whether the incoming message is malicious and blocking incoming messages determined to be malicious from reaching the web server.

A computer storage medium including computer executable code for maintaining computer security includes code for accessing a signature file, code for receiving an incoming message from at least one client computer, code for comparing the received incoming message with the signature file to determine whether the incoming message is malicious, and code for blocking the incoming messages determined to be malicious from reaching a web server.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
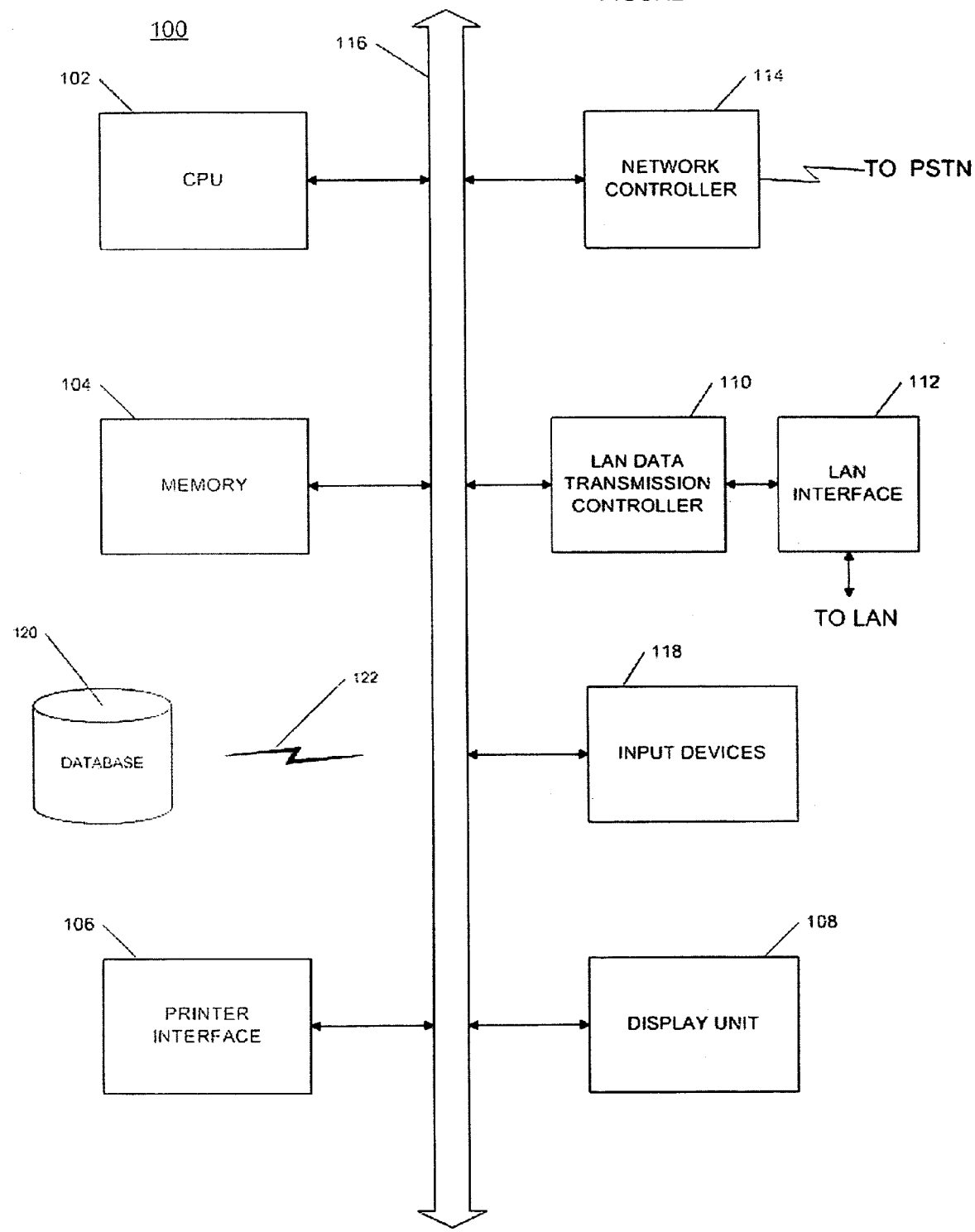
FIG. 1 illustrates an example of a computer system capable of implementing the method and apparatus of the present disclosure.

In describing preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

FIG. 1 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system referred to generally as system 100 may include a central processing unit (CPU) 102, for example, Random Access Memory (RAM) 104, a printer interface 106, a display unit 108, a (LAN) local area network data transmission controller 110, a LAN interface 112, a network controller 114, an internal bus 116, and one or more input devices 118, for example, a keyboard, mouse etc. As shown, the system 100 may be connected to a data storage device, for example, a hard disk, 120, via a link 122.

Figure 2:
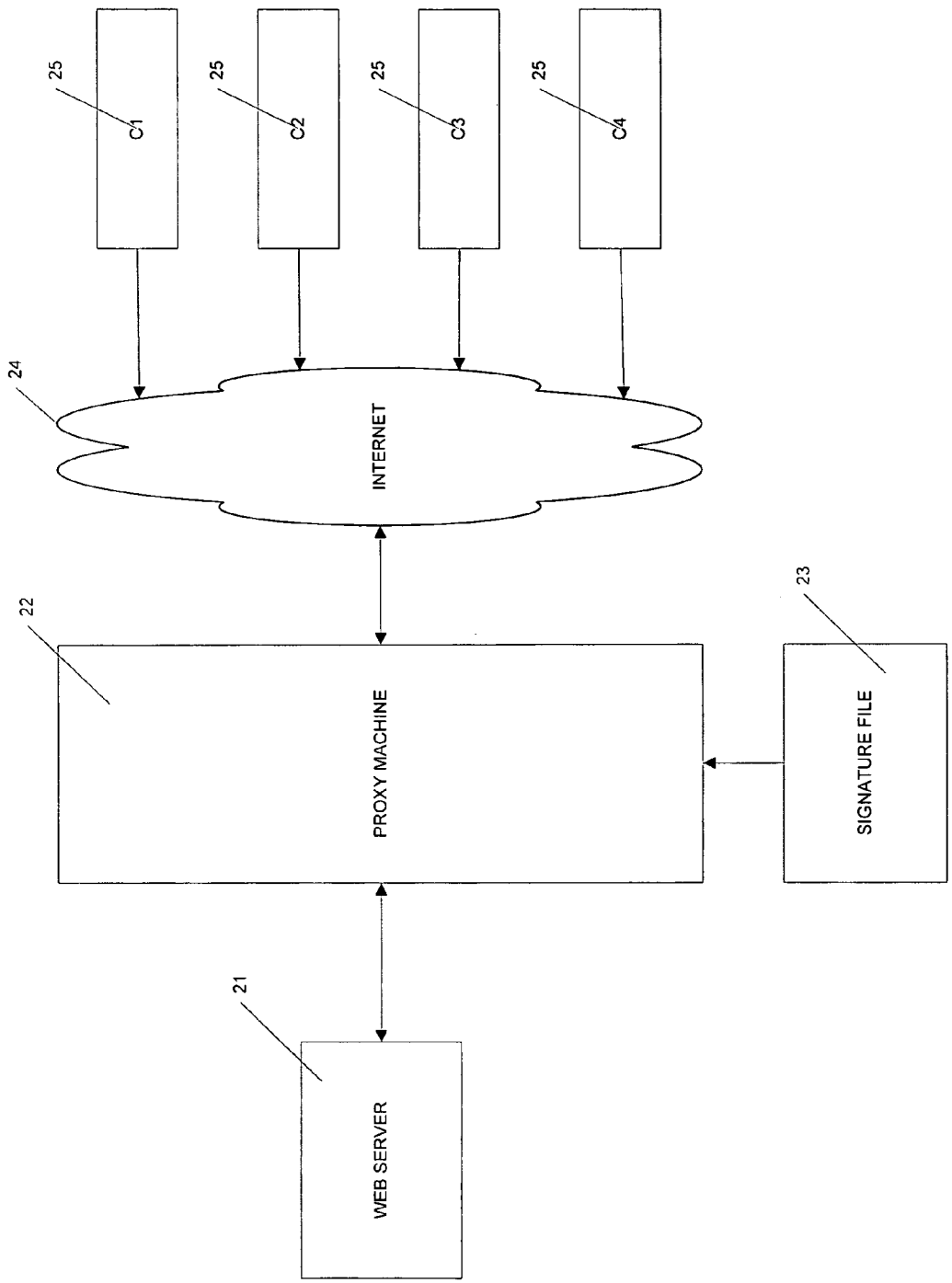
FIG. 2 is a block diagram illustrating a system of maintaining computer security according to an embodiment of the present disclosure.

A system for maintaining computer security according to an embodiment of the present disclosure is described with reference to FIG. 2. A proxy machine 22 provides an interface between a client web server 21 and the Internet 24. The domain name service (DNS) entry for web server 21 points to proxy machine 22. Signature file 23 contains information about known vulnerabilities and exploits and makes this information available to proxy machine 22.

When used in conjunction with signature file 23, proxy machine 22 works to protect client web server 21 from malicious HTTP attacks. When a system, such as one of client computers 25, attempts to access web server 21 via the Internet 24, the HTTP access request message first goes through proxy machine 22. Proxy machine 22 then detenmines, based on the signatures in signature file 23, whether the received message from client computer 25 is malicious. If proxy machine 22 determines that the message from client computer 25 is in fact malicious, proxy machine 22 blocks the message from ever going to web server 21, thereby preventing it from ever exploiting web server 21. On the other hand, if proxy machine 22 determines that the message from client computer 25 is not malicious, it will forward it to web server 21.

To illustrate this concept further, a client computer 25 on Internet 24 may attempt a buffer overflow attack on web server 21, which is an example of the type of attack which can be detected by the present disclosure. A buffer overflow attack occurs when a program attempts to write more data onto a buffer area in web server 21 than it can hold. This causes an overwriting of areas of stack memory in the web server 21. If performed correctly, this allows malicious code to be placed on the web server 21 which would then be executed. For example, a HTTP header contains the Universal Resource Locator (URL) of the resource to be retrieved from a web server. Assume that a URL of over 4,096 bytes long would cause a buffer overflow in web server 21 and that this is a known HTTP attack and thus a signature for identifying this attack is present in signature file 23. If client computer 25 tries to send a URL to web server 21 that is over 4,096 bytes long, the signature in signature file 23 will tell proxy machine 22 that because the URL in the HTTP header is longer than the defined length, it should be blocked from reaching the web server 21. Signature file 23 and proxy machine 22 are thus able to ensure that web server 21 is protected from malicious attacks.

Figure 3:
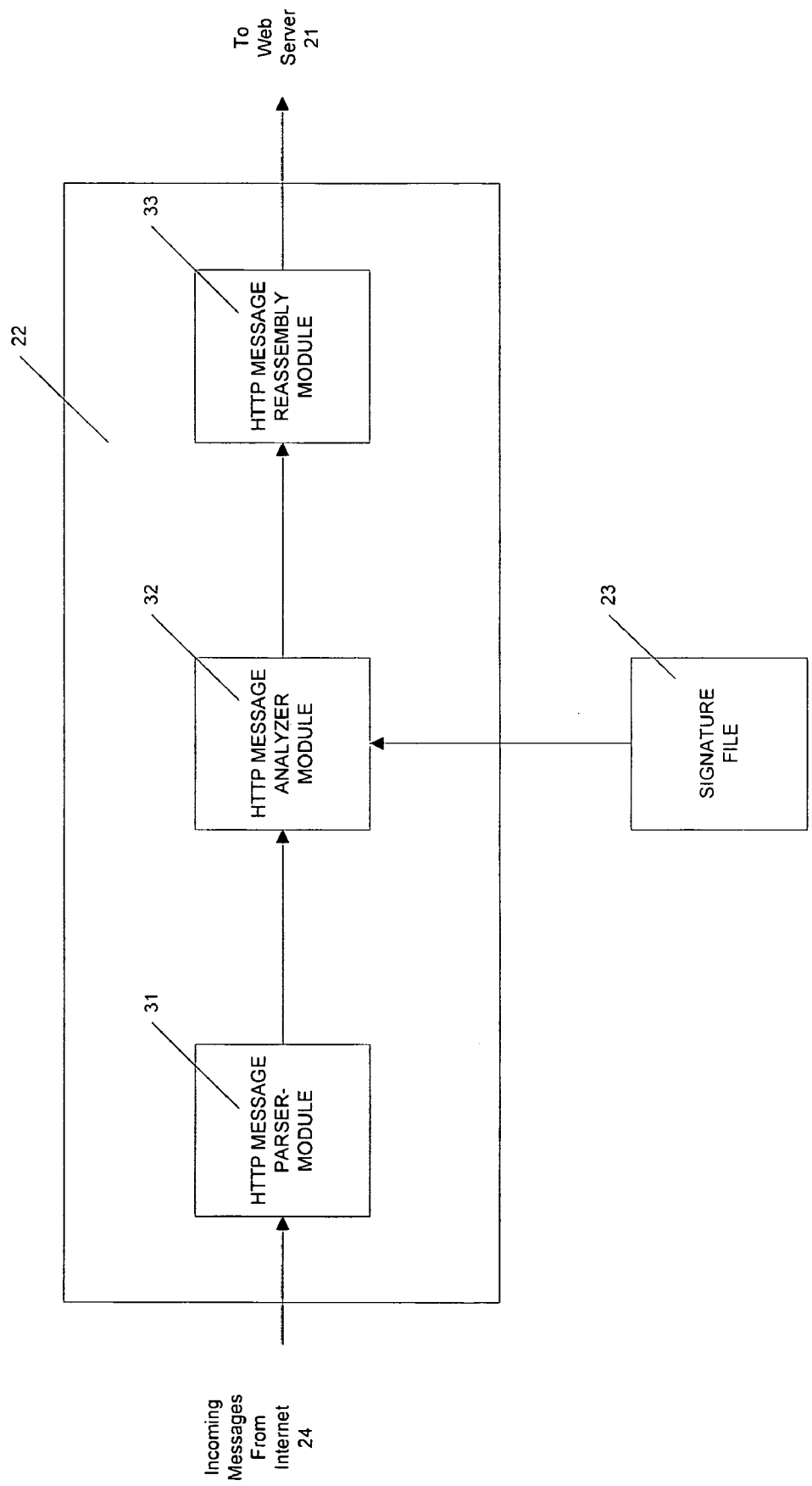
FIG. 3 is a block diagram illustrating the basic architecture of a proxy machine according to an embodiment of the present disclosure.
Figure 7:
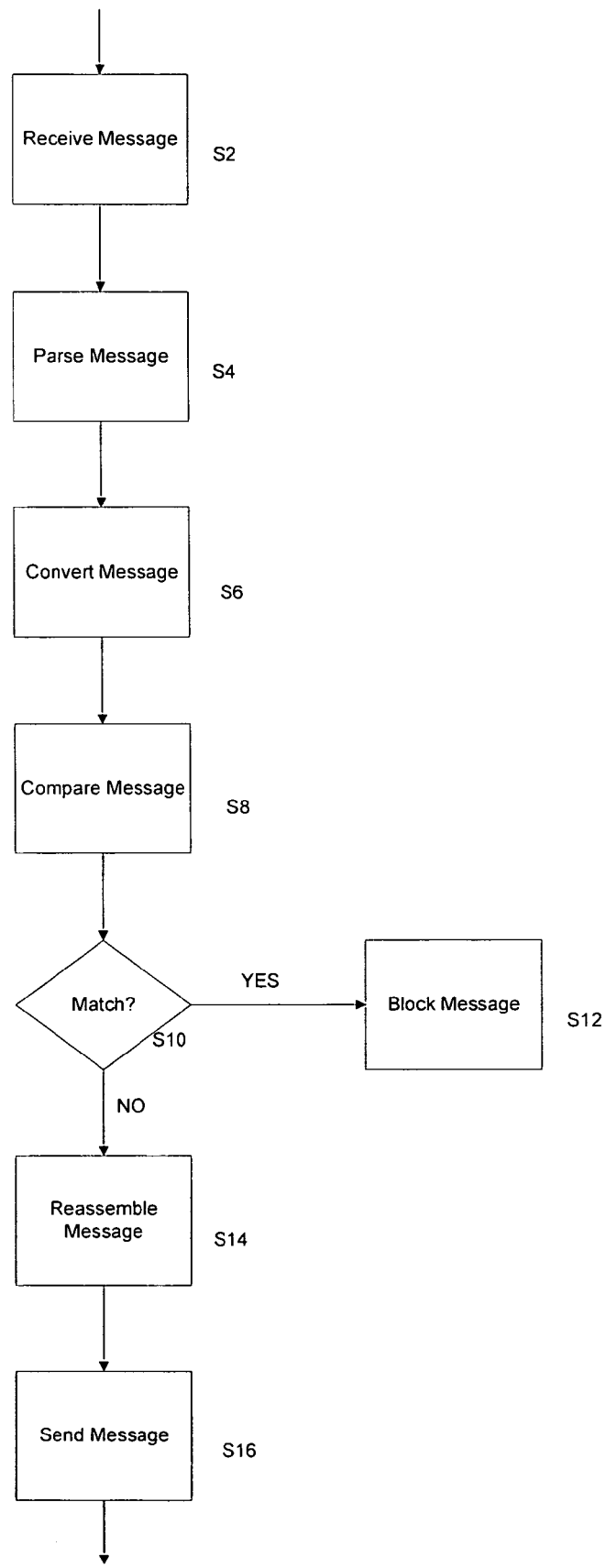
FIG. 7 is a flow chart for describing operation of the proxy machine.

FIG. 3 illustrates the basic architecture of proxy machine 22 and FIG. 7 is a flow chart for explaining the operation of proxy machine 22 according to embodiments of the present disclosure. As noted above, incoming messages from systems on the Internet 24 first pass through proxy server 22. According to an embodiment of the present disclosure, proxy server 22 is composed of an HTTP message parser module 31, an HTTP message analyzer module 32 and an HTTP message reassembly module 33. The HTTP message parser module 31 receives an incoming message (Step S2), parses the incoming message (Step S4) and converts it into an internal structure that HTTP message analyzer module 32 recognizes (Step S6). The data in the internal structure is then compared with the information in signature file 23 by HTTP message analyzer module 32 (Step S8). If HTTP message analyzer module 32 finds a match in signature file 23 (YES, Step S10), the message is blocked from ever reaching web server 21 (Step S12). In addition, proxy machine 22 may also update a log with information specifying the time and type of attack detected in the malicious message. According to another embodiment, proxy machine 22 may make note of the machine that sent the malicious message and then automatically block any additional messages from that sending machine and/or prompt the user that this sending machine is again attempting access to the server. If there is no match in signature file 23 (NO, Step S10), the message is reassembled into its original HTTP message format by HTTP message reassembly module 33 (Step S14) and is then sent to web server 21 (Step S16).

Figure 4:
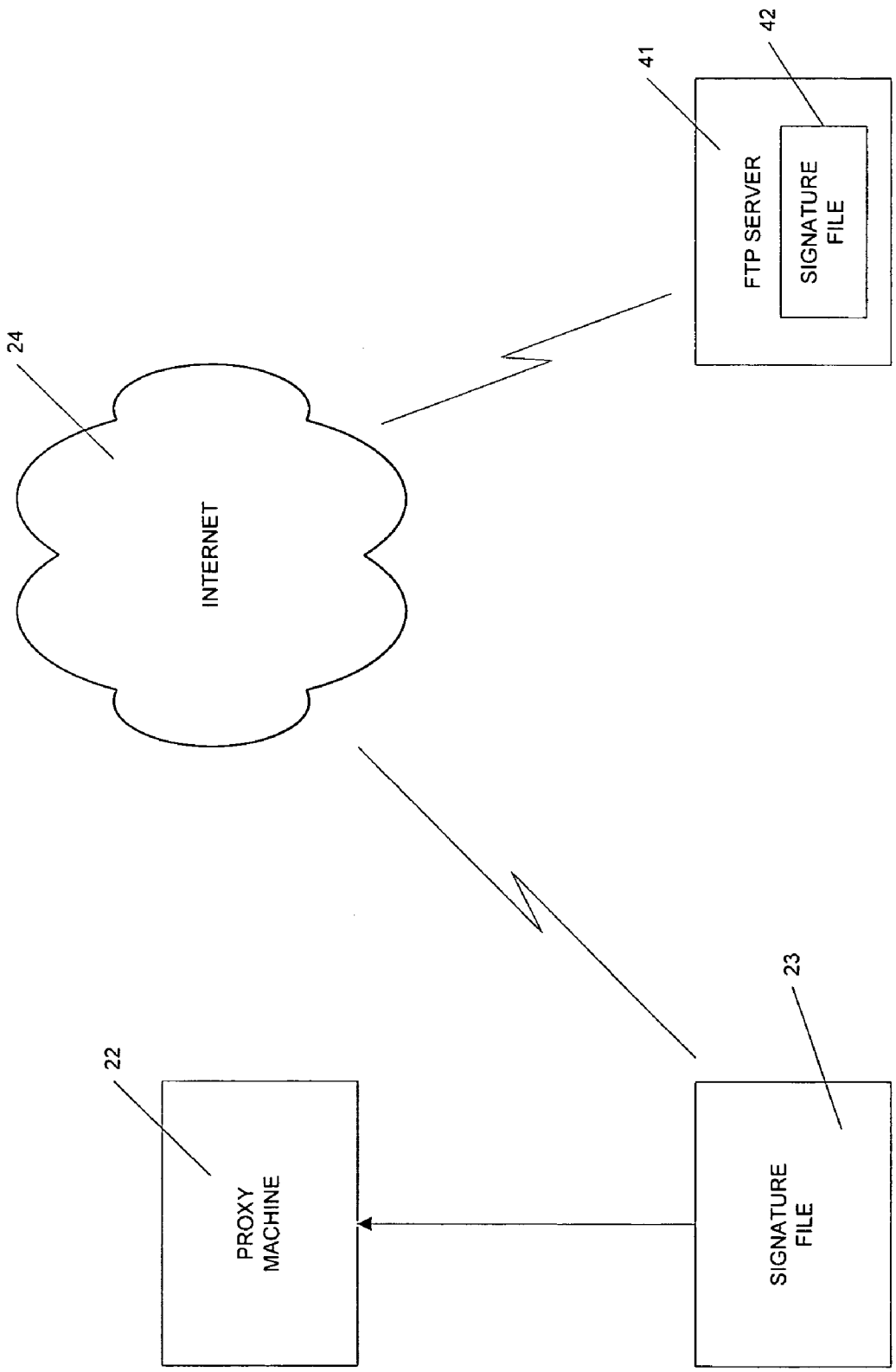
FIG. 4 is a block diagram illustrating the relationship between a proxy machine and a signature file according to an embodiment of the present disclosure.

The relationship between proxy machine 22 and signature file 23 according to an embodiment of the present disclosure is described with reference to FIG. 4. According to this embodiment of the present disclosure, signature file 23 is periodically updated to protect against the most up to date attacks. To do so, signature file 23 periodically accesses FTP Server 41 via the Internet 24 and downloads the latest versions of signature files 42.

Figure 5:
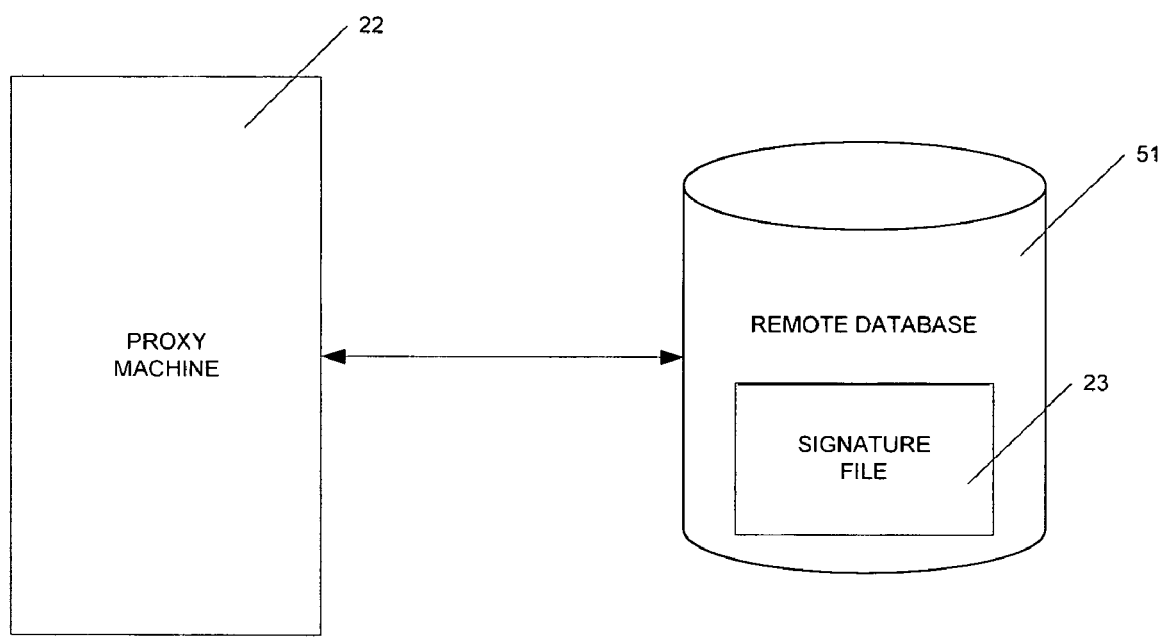
FIG. 5 is a block diagram illustrating the relationship between a proxy machine and a signature file according to an alternate embodiment of the present disclosure.
Figure 6:
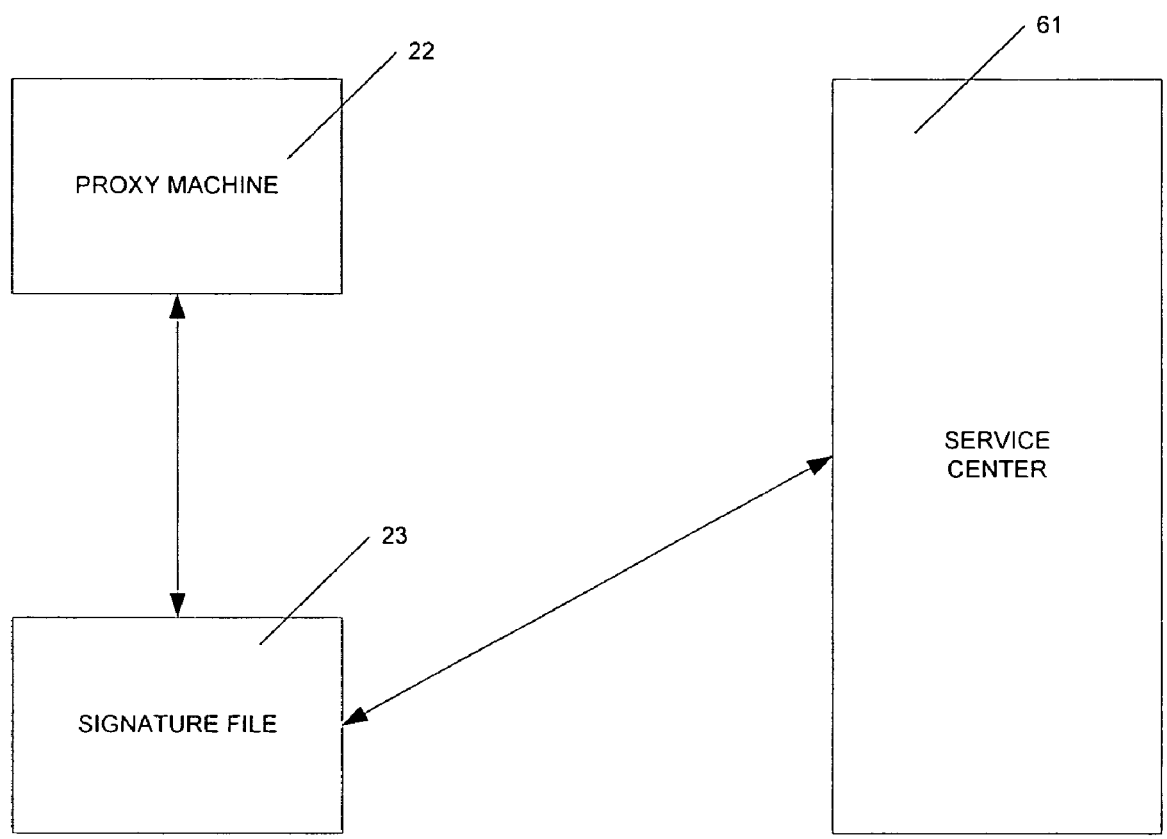
FIG. 6 is a block diagram illustrating the relationship between a proxy machine and a signature file according to an alternate embodiment of the present disclosure.

According to another embodiment, as shown in FIG. 5, instead of proxy machine 22 getting information from signature file 23, proxy machine 22 queries a remote database 51 for matching signatures. According to yet another embodiment, as shown in FIG. 6, a service center 61 automatically sends updated signature files to signature file 23 periodically or whenever a new attack is discovered.

The present method and system thus provides an efficient and convenient way to protect a computer system from malicious attacks.

Numerous additional modifications and variations of the present disclosure are possible in view of the above-teachings. It is therefore to be understood that within the scope of the appended claims, the present disclosure may be practiced other than as specifically described herein.

What is claimed is:

1. A method for maintaining computer security comprising:
    providing a signature file containing information about known system vulnerabilities, the information comprising a predefined length of a Universal Resource Locator ("URL") for a message header, the predetermined length indicating a maximum amount of data that may be stored in a buffer of a web server;
    at a reverse proxy server residing between at least one client computer and the web server:
        receiving an incoming message from the at least one client computer, wherein the incoming message, if malicious and upon receipt by the web server, automatically causes the web server to perform an action which exploits a vulnerability of the web server;
        comparing a length of a URL in a message header of the incoming message ("the incoming URL") with the predefined length in the signature file to determine whether the incoming message is malicious, wherein the length of the incoming URL indicates an amount of data that the incoming message will attempt to store on the buffer if the incoming message is received by the web server; and
        if the length of the incoming URL exceeds the predefined length, determining that the incoming message is malicious because the incoming message is capable of causing the buffer to overflow and blocking the incoming message from reaching the web server.

2. The method of claim 1, wherein the comparing further comprises:
    parsing the incoming message;
    converting the incoming message into an internal structure;
    comparing the converted incoming message with the signature file; and
    determining whether the converted incoming message is malicious based on the comparison.

3. The method of claim 2, further comprising reassembling the converted incoming message back into its original structure prior to forwarding it to the web server if it is determined that the code is not malicious.

4. The method of claim 1, further comprising forwarding the incoming message to the web server if the length of the incoming URL is less than the predefined length.

5. The method of claim 1, wherein the signature file contains information about known vulnerabilities of the web server.

6. The method as claimed in claim 1, wherein the signature file is made available through a web server.

7. The method as claimed in claim 1, further comprising continuously updating the signature file.

8. The method as claimed in claim 1, further comprising periodically downloading the signature file in order to make its copy current.

9. The method of claim 1, wherein the incoming message comprises a Hypertext Transfer Protocol ("HTTP") message.

10. The method of claim 1, wherein the information comprises a list of known system vulnerabilities; and further comprising:
    comparing one or more characteristics of the incoming message with the list to determine whether the incoming message is malicious; and
    if the one or more characteristics fail to satisfy any of the vulnerabilities on the list of known system vulnerabilities, determining that the incoming message is not malicious and forwarding the incoming message to the web server.

11. The system of claim 10, wherein at least one of the known system vulnerabilities is specific to the web server.

12. The method of claim 1, wherein the incoming message is received from a first client computer; and further comprising:
    if the incoming message is determined to be malicious, identifying the first computer; and
    automatically blocking future messages received from the first client computer.

13. A system for maintaining computer security comprising:
  a web server;
  a signature file containing information about known system vulnerabilities, the information comprising a predefined length of a Universal Resource Locator ("URL") for a message header, the predetermined length indicating a maximum amount of data that may be stored in a buffer of the web server; and
  a tangible processor controlled device comprising a reverse proxy server residing between at least one client computer and the web server, the reverse proxy server configured to:
    receive an incoming message from the at least one client computer, wherein the incoming message, if malicious and upon receipt by the web server, automatically causes the web server to perform an action which exploits a vulnerability of the web server;
    compare a length of a URL in a message header of the incoming message ("the incoming URL") with the predefined length in the signature file to determine whether the incoming message is malicious, wherein the length of the incoming URL indicates an amount of data that the incoming message will attempt to store on the buffer if the incoming message is received by the web server; and
    if the length of the incoming URL exceeds the predefined length, determine that the incoming message is malicious because the incoming message is capable of causing the buffer to overflow and block the incoming message from reaching the web server.

14. The system of claim 13, wherein the reverse proxy server further comprises:
  a Hypertext Transfer Protocol ("HTTP") message parser module for receiving, parsing and converting the incoming messages into a defined structure:
  an HTTP message analyzer module for comparing the converted incoming messages with the signature file; and
  an HTTP message reassembly module for reassembling the converted incoming messages determined not to be malicious into their original structure and forwarding them to the web server.

15. The system of claim 13, wherein the signature file contains information about known vulnerabilities of the web server.

16. The system of claim 13, wherein the signature file is made available through a web server.

17. The system of claim 13, wherein the signature file is continuously updated.

18. The system of claim 13, wherein the reverse proxy server periodically downloads the signature file in order to make its copy current.

19. The system of claim 14, wherein the signature file is linked to the HTTP message analyzer module.

20. The system of claim 13, wherein the incoming message comprises a Hypertext Transfer Protocol ("HTTP") message.

21. A non-transitory computer storage medium including computer executable code for maintaining computer security, the computer executable code comprising:
  code for accessing a signature file containing information about known system vulnerabilities, the information comprising a predefined length of a Universal Resource Locator ("URL") for a message header, the predetermined length indicating a maximum amount of data that may be stored in a buffer of a web server;
  code for at a hypertext transfer protocol ("HTTP") reverse proxy server residing between at least one client computer and the web server:
    receiving an incoming message from the at least one client computer, wherein the incoming message, if malicious and upon receipt by the web server, automatically causes the web server to perform an action which exploits a vulnerability of the web server;
    comparing a length of a URL in a message header of the incoming message ("the incoming URL") with the predefined length in the signature file to determine whether the incoming message is malicious, wherein the length of the incoming URL indicates an amount of data that the incoming message will attempt to store on the buffer if the incoming message is received by the web server; and
    if the length of the incoming URL exceeds the predefined length, determining that the incoming message is malicious because the incoming message is capable of causing the buffer to overflow and blocking the incoming message from reaching the web server.

22. The computer storage medium of claim 21, further comprising:
  code for parsing the incoming message;
  code for converting the incoming message into an internal structure;
  code for comparing the converted incoming message with the signature file; and
  code for determining whether the converted incoming message is malicious based on the comparison.

23. The computer storage medium of claim 22, further comprising code for reassembling the converted incoming message back into its original structure if it is determined that the code is not malicious.

24. The computer storage medium of claim 23, further comprising code for forwarding the reassembled message to the web server.

25. The computer storage medium of claim 21, wherein the signature file contains information about known vulnerabilities of the web server.

26. The computer storage medium of claim 21, wherein the signature file is made available through a web server.

27. The computer storage medium of claim 21, further comprising code for continuously updating the signature file.

28. The computer storage medium of claim 21, further comprising code for periodically downloading the signature file in order to make its copy current.

29. The computer storage medium of claim 14, wherein the incoming message comprises a Hypertext Transfer Protocol ("HTTP") message.

30. A method for maintaining computer security comprising:
  providing a signature file containing information about known system vulnerabilities, the information comprising a predefined length of a Universal Resource Locator ("URL") for a message header, the predetermined length indicating a maximum amount of data that may be stored in a buffer of a web server;
  receiving an incoming message from at least one client computer;
  comparing a length of a URL in a message header of the incoming message ("the incoming URL") with the predefined length in the signature file to determine whether the incoming message is malicious, wherein the length of the incoming URL indicates an amount of data that the incoming message will attempt to store on the buffer if the incoming message is received by the web server; and if the length of the incoming URL is greater than the predefined length, determining that the incoming message is malicious because the incoming message is capable of causing the buffer to overflow and blocking the incoming message from reaching the web server.

31. The method of claim 30, further comprising if the incoming message is determined to be malicious, blocking future messages received from the at least one client computer.

32. The method of claim 30, further comprising forwarding the incoming message to the web server if the length of the incoming URL is less than the predefined length.

* * * * *